United States Patent Office 3,247,217
Patented Apr. 19, 1966

3,247,217
CERTAIN BENZIMIDAZOLE DERIVATIVES
Ferdinand Grewe, Cologne-Stammheim, Helmuth Kaspers, Leverkusen, and Christian Wiegand, Wuppertal-Elberfeld, Germany, assignors to Farbenfabriken Bayer Aktiengesellschaft, Leverkusen, Germany, a corporation of Germany
No Drawing. Filed Oct. 11, 1960, Ser. No. 61,839
Claims priority, application Germany, Oct. 14, 1959,
F 29,605
12 Claims. (Cl. 260—299)

The present invention relates to and has as its objects new and useful organic compounds, the production thereof and their use as protective agents against fungi-diseases on plants. The new compounds according to the present invention may be represented by the following general formula:

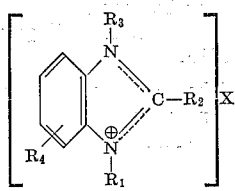

wherein one of the radicals $R_1$, $R_2$ and $R_3$ stands for a lower alkyl radical with 1 to about 4 carbon atoms which may also be substituted by hydroxyl groups, another one for a higher alkyl radical with at least 8 carbon atoms and the remaining radical for an aryl residue, $R_4$ stands for a substituent of the benzene nucleus, X denotes an acid radical, which renders the molecule water-insoluble or difficultly soluble in water.

It is known that water-soluble salts of 1-methyl-2-phenyl-3-dodecylbenzimidazole can be used as disinfecting agents with fungicidal or bactericidal action (see, e.g. German patent application 1,040,752).

Furthermore it is known from U.S. patent specification 2,782,204 that certain 1,3-di-higher-alkyl-benzimidazoline-bromides possess fungicidal properties which makes them useful in the field of disinfection. It is also known from J. Pharm. Soc. Japan, vol. 63 (1943), pages 593–599, that certain 1-higher-alkyl-3-lower-alkyl-benzimidazoline salts may be used as inert soaps and that some of the compounds mentioned in the aforementioned journal also possess bactericidal action useful in the field of disinfection.

All these compounds, however, were as yet not used for the protection of living plants, because they damage them or because their effect is only of short duration.

In accordance with the present invention it has now been found that water-insoluble or slightly soluble salts of the above mentioned compounds are highly active against fungi causing plant diseases.

The preparation of these salts can be carried out according to methods known as such. In its simplest way aqueous solutions of the soluble components are given together in about equimolecular proportions. But sometimes also aqueous alcoholic solutions of the starting materials may be used.

The above mentioned water-insoluble or difficultly soluble salts are new agents for the protection of plant cultures. They are highly active against phytopathogenic fungi and readily tolerated by the plants.

As it can be seen from the formula, the position of the lower alkyl group and the aryl group in the compound may be interchanged. Thus, for example, the salts of 1-phenyl-2-methyl-3-dodecylbenzimidazole are just as active as the corresponding salts of the reversed compound. As it is to be seen also substituents ($R_4$), preferably lower alkyl, alkoxy radicals, nitro groups, chlorine atoms, bromine atoms and the like, may be present in the benzene ring of the benzimidazole or also in the aryl radical standing in the 1- or 2-position.

More specifically the ions X which render the benzimidazole water-insoluble are complex-ions such as

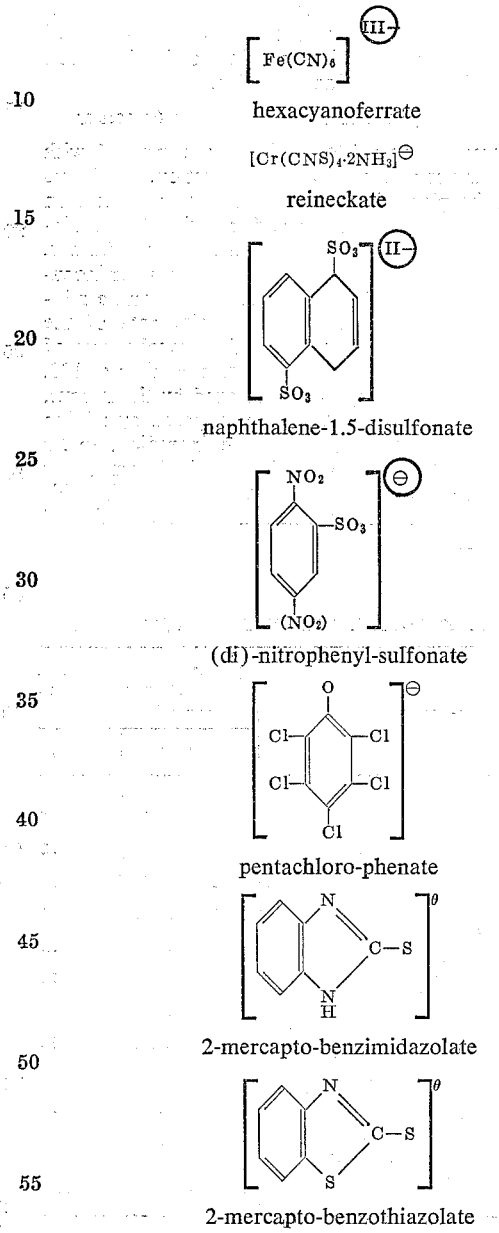

The salts of the aforesaid type are highly active against, for example, the following fungi which are the agents of economically important plant diseases, without thereby limiting the action of these fungi:

Phytophthora infestans
Alternaria solani
Plasmopara viticola
Venturia inaequalis
Cladosporium fulvum
Botrytis cinerea It is of great practical importance that the compounds according to the invention are also active against fungi which are known as agents of powdery mildew diseases such as varieties of the Erysiphe or near related species.

By their application in practical plant protection it is therefore possible not only to combat downy mildew fungi but also to contain powdery mildew diseases occurring simultaneously in the same plant cultures to such an extent that they no longer cause any economically important damage. The majority of organic fungicides which are at present used for practical plant protection against downy mildew fungi are not effective against powdery mildew species and are even suspected of conditioning the plant cultures for the development of powdery mildew fungi, their practical value being thereby increasingly diminished. The preparation of the new compounds and the fungicidal properties of the compounds according to this invention are illustrated by the following examples:

*Example 1.*—Phythophthora infestans *on tomatoes*

Young tomato plants (Bonny Best) are sprayed with aqueous emulsions in the stated concentration. 24 hours later, when the plants have dried off, they are placed in a moisture chamber at random and inoculated by sprinkling over with zoospores of *Phythophthora infestans*. They remain, until evaluation on the sixth day after inoculation, in the moisture chamber at 18–20° C. and a relative humidity of 98–100%. The casualty rate of the treated plants is given in percent of the casualty rate of the untreated controls whose casualty rate is taken as 100. Untreated plants are completely destroyed by the fungus.

The aqueous emulsions have been prepared by adding 1 gram of the finely powdered active ingredient to 50 ml. of acetone containing 6% of a non-ionic emulsifier (benzyl hydroxy polyglycol ether) and then diluting this mixture with water to the desired concentration indicated in the table below.

TABLE 1.—*PHYTHOPHTHORA INFESTANS*/TOMATOES

| Preparation | Casualty rate at preparation concentrations in percent— | | |
|---|---|---|---|
| | 0.025 | 0.0125 | 0.00625 |
| 1-methyl-2-phenyl-3-dodecyl-benzimidazole-hexacyanoferrate | 4 | 17 | 25 |
| 1-methyl-2-phenyl-3-dodecyl-benzimidazole-2-nitrobenzene-sulfonate | 11 | 14 | 23 |
| 1-methyl-2-phenyl-3-dodecyl-benzimidazole-2,4-dinitrobenzene-sulfonate | 16 | 26 | 28 |
| 1-phenyl-2-methyl-3-dodecyl-benzimidazole-O-nitrobenzene-sulfonate | 10 | | 41 |
| 1-methyl-2-phenyl-3-dodecyl-5-ethoxy-benzimidazole-reineckate | 17 | | 22 |
| 1-methyl-2-p-methoxyphenyl-3-dodecyl-benzimidazole-hexacyano-ferrate | 13 | | 29 |
| 1-methyl-2-phenyl-3-dodecyl-benzimidazole-O-nitro-benzene-sulfonate | 18 | | 37 |
| 1-methyl-2-phenyl-3-dodecyl-benzimidazole-2,4-dinitro-benzene-sulfonate | 14 | | 35 |
| 1-methyl-2-phenyl-3-dodecyl-benzimidazole-reineckate | 10 | | 38 |
| 1-methyl-2-phenyl-3-dodecyl-benzimidazole-mercapto-benzothiazolate | 10 | | 20 |
| 1-methyl-2-phenyl-3-dodecyl-benzimidazole-mercapto-benzimidazolate | 17 | | 48 |
| 1-methyl-2-phenyl-3-dodecyl-benzimidazole-pentachloro-phenolate | 1 | | 34 |
| Untreated control | | 100 | |

*Example 2.*—Venturia inaequalis (Fusicladium dendriticum) *on apples*

One-year-old potted apple seedlings (Grahams Jubilee) are sprayed with aqueous emulsions prepared as said before in Example 1. After drying off, inoculation is effected in a moisture chamber by sprinkling over with conidia of *Venturia inaequalis*. The inoculated plants remain in the moisture chamber at 20–23° C. and a relative humidity of 98–100% for 48 hours and are then placed in a greenhouse until evaluation on the 18th to 20th day after inoculation. The casualty rate is stated in the same manner as in the preceding example.

TABLE 2.—*VENTURIA INAEQUALIS*/APPLES

| Preparation | Casualty rate at preparation concentrations in percent | |
|---|---|---|
| | 0.05 | 0.025 |
| 1-methyl-2-phenyl-3-dodecyl-benzimidazole-hexacyanoferrate | 11 | 13 |
| Untreated control | 100 | |

*Example 3.*—Venturia inaequalis

The high activity of the compound of Example 2 against *Venturia inaequalis* were confirmed also in the field. Apple trees (Morgenduft) which were treated with spraying liquors of a preparation of the above mentioned compound containing 0.04% of active substance remained practically completely free of scab on leaves and fruit, whilst liquors of a preparation from zinc-dimethyl-dithiocarbamate containing 0.135% of active substance enabled a slight infestation to occur. The power of the infection pressure can be seen from the casualty rate of the untreated control trees, the foliage of which showed a damage rate of 80%.

*Example 4.*—Erysiphe polyphaga *on cucumber (cucumber powdery mildew)*

Young cucumber plants (Beste von Allen) are sprayed with aqueous liquors of the preparation in the stated concentrations. After drying off, they are placed in a greenhouse at 23–25° C. and a relative humidity of about 70% and inoculated with conidia of the fungus by dusting evenly. In the case of a curative application of the preparations, the spraying with the preparation liquors is carried out only after the inoculated plants show the first symptoms of infestation, i.e., 5–6 days after inoculation, by spraying twice at an interval of 3 days. Similarly to the preceding examples, the casualty rate is given in percent of the casualty of the untreated control plants.

The leaves of untreated plants, at the moment of evaluation, i.e., 14–16 days after inoculation, are completely covered by the mycelium of the fungus and begin to die off.

TABLE 3.—*ERYSIPHE POLYPHAGA*/CUCUMBERS

| Preparation | Casualty rate at preparation concentrations in percent | | | | | |
|---|---|---|---|---|---|---|
| | Protective (appl.-1 spray) | | | Curative (appl.-2 sprays) | | |
| | 0.02 | 0.01 | 0.005 | 0.02 | 0.01 | 0.005 |
| 1-methyl-2-phenyl-3-dodecyl-benzimidazole-hexacyanoferrate | 5 | 18 | 70 | 38 | 43 | 56 |
| Untreated control | | 100 | | | 100 | |

Compounds which are of same activity as those mentioned in the examples are the following:

1-ethyl-2-phenyl-3-dodecyl-benzimidazole-hexacyanoferrate,
1-hydroxy-ethyl-2-phenyl-3-dodecyl-benzimidazole-hexacyanoferrate,
1-methyl-2-p-chlorophenyl-3-dodecyl-benzimidazole-reineckate,
1-methyl-2-phenyl-3-octyl-benzimidazole-naphthalene-1,5-disulfonate,
1-ethyl-2-(p-xylyl)-3-hexadecyl-benzimidazole-2,4-dinitrobenzenesulfonate,
1-methyl-2-phenyl-3-octadecyl-benzimidazole-hexacyanoferrate,
1-methyl-2-phenyl-3-dodecyl-5-methyl-benzimidazole-hexacyanoferrate, 1-methyl-2-phenyl-3-dodecyl-6-chloro-benzimidazole-hexacyanoferrate,
1-methyl-2-phenyl-3-dodecyl-6-nitro-benzimidazole-hexacyanoferrate.

The compounds to be used according to this invention can be applied as suspensions or emulsions or also as dusts admixed with other inert materials such as talc, chalk, bentonite, clay, kieselguhr, etc.

When preparing dispersible sprays, the active compounds are mixed with inert materials (such as said before) and then ground in the presence of suitable wetting and dispersing agents. Their combined application with other (even inorganic) fungicides and/or insecticides is possible.

*Example 5*

30 grams (0.12 mol) of kalium-hexacyanoferrate are dissolved in 250 ml. of water. This solution is poured slowly into a solution of 135 grams of 1-methyl-2-phenyl-3-dodecyl-benzimidazole-bromide dissolved in 500 ml. of water. After stirring rapidly the precipitate of 1-methyl-2-phenyl-3-dodecyl-benzimidazole-hexacyanoferrate is collected by filtration with suction, and washed with water to remove unreacted material. After drying the yield of the reaction product amounts to 88%. The compound is a slightly colored powder which melts under decomposition. All the other compounds mentioned in the foregoing examples as well as in the description may be prepared by exactly the same procedure. Sometimes it is advisable to dissolve one compound in an aqueous alcoholic solution or an aqueous acetonic solution to secure a precipitation in powderous form. Usually it is advisable to use the salt which contains the cation $X^-$ of the formula in the beginning of the description in a slight excess.

If the compound precipitates as an oil sometimes the raw material may be washed free from unreacted organic material by using ether or benzene, whereafter usually the salt crystallizes or solidifies. It then may be milled to a particle size as described.

We claim:
1. A benzimidazolium salt of the following formula

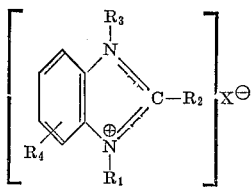

wherein $R_1$ stands for alkyl having up to 4 carbon atoms, $R_2$ stands for a member selected from the group consisting of phenyl, lower alkoxy phenyl, chlorophenyl and lower alkyl phenyl, $R_3$ stands for alkyl having 8 to 18 carbon atoms, $R_4$ stands for a member selected from the group consisting of hydrogen, lower alkyl, lower alkoxy, nitro, chloro and bromo, and X denotes a member selected from the group consisting of hexacyanoferrate, 2-nitrobenzene sulfonate, 2,4-dinitrobenzene sulfonate, reineckate, mercaptobenzothiazolate, mercaptobenzimidazolate, pentachlorophenolate and naphthalene-1,5-disulfonate.

2. The 1 - methyl - 2 - phenyl - 3 - dodecyl - benzimidazole-hexacyanoferrate.

3. The 1 - methyl - 2 - phenyl - 3 - dodecyl - benzimidazole-2-nitrobenzene-sulfonate.

4. The 1 - methyl - 2 - phenyl - 3 - dodecyl - benzimidazole-2.4-dinitrobenzene-sulfonate.

5. The 1 - methyl - 2 - phenyl - 3 - dodecyl - 5 - ethoxybenzimidazole-reineckate.

6. The 1 - methyl - 2 - p - methoxy-phenyl-3-dodecyl-benzimidazole-hexacyanoferrate.

7. The 1 - methyl - 2 - phenyl - 3 - dodecyl - benzimidazole-O-nitrobenzene-sulfonate.

8. The 1 - methyl - 2 - phenyl - 3 - dodecyl - benzimidazole -2.4-dinitrobenzene-sulfonate.

9. The 1 - methyl - 2 - phenyl - 3 - dodecyl-benzimidazole-reineckate.

10. The 1 - methyl - 2 - phenyl - 3 - dodecyl-benzimidazole-mercaptobenzene-thiazolate.

11. The 1 - methyl - 2 - phenyl - 3 - dodecyl - benzimidazole-mercapto-benzimidazolate.

12. The 1 - methyl - 2 - phenyl - 3 - dodecyl - benzimidazolee-penta-chloro-phenolate.

References Cited by the Examiner

UNITED STATES PATENTS

| | | | |
|---|---|---|---|
| 2,043,164 | 6/1936 | Graenacher | 260—309.2 |
| 2,056,449 | 10/1936 | Graenacher et al. | 260—309.2 |
| 2,065,418 | 12/1936 | Andersag et al. | 260—299 |
| 2,104,491 | 1/1938 | McKinney | 167—42 |
| 2,312,923 | 3/1943 | Martin et al. | 260—309.2 |
| 2,739,149 | 3/1956 | Van Lare et al. | 260—309.2 |
| 2,876,233 | 3/1959 | Herrling et al. | 260—309.2 |
| 2,890,150 | 6/1959 | Baldwin et al. | 167—33 |
| 2,933,502 | 4/1960 | Klopping | 260—299 |
| 3,097,132 | 7/1963 | Wiegand et al. | 260—299 |

OTHER REFERENCES

Barnes, Chem. Abstracts, vol. 36, page 7248 (1942).
Carlson et al., Chem. Abstracts, vol. 31, page 365 (1937).
Elderfield, "Heterocyclic Compounds," vol. 5, pages 285, 288 (1957).
Ried et al., Chem. Abstracts, vol. 53, col. 1373 (1959).
Wiegand, German Auslegeschrift, 1,040,752, Oct. 9, 1958, 3 pages.

NICHOLAS S. RIZZO, *Primary Examiner.*

IRVING MARCUS, DUVAL T. McCUTCHEN, WALTER A. MODANCE, *Examiners.*